United States Patent [19]

Tamada et al.

[11] Patent Number: 5,153,783
[45] Date of Patent: Oct. 6, 1992

[54] ELECTRONIC STILL CAMERA

[75] Inventors: Kazukiyo Tamada; Kiyotaka Kaneko, both of Tokyo; Motohiko Horio; Kazutsugu Ogata, both of Omiya, all of Japan

[73] Assignee: Fuji Photo Film Co., Ltd., Kanagawa, Japan

[21] Appl. No.: 853,900

[22] Filed: Mar. 19, 1992

Related U.S. Application Data

[63] Continuation of Ser. No. 474,621, Jan. 16, 1990, abandoned, which is a continuation of Ser. No. 134,120, Dec. 17, 1987, abandoned.

[30] Foreign Application Priority Data

Dec. 25, 1986 [JP] Japan .................. 61-310339
Oct. 20, 1987 [JP] Japan .................. 62-264228

[51] Int. Cl.$^5$ .................. H04N 5/78; H04N 5/76
[52] U.S. Cl. .................. 360/35.1; 358/906; 358/335
[58] Field of Search .................. 360/35.1; 356/906, 909, 356/778, 213.12, 213.13, 213.19; 354/341–342, 344

[56] References Cited

U.S. PATENT DOCUMENTS

| | | | |
|---|---|---|---|
| 4,504,866 | 3/1985 | Saito | 360/35.1 X |
| 4,536,074 | 8/1985 | Someya et al. | 554/442 |
| 4,609,274 | 9/1986 | Iwashita et al. | 354/445 X |
| 4,658,304 | 4/1987 | Tsunekawa et al. | 360/35.1 X |
| 4,686,572 | 8/1987 | Takatsu | 358/413.13 |
| 4,695,888 | 9/1987 | Peterson | 358/213.13 |
| 4,746,988 | 5/1988 | Nutting et al. | 358/228 |
| 4,763,196 | 8/1988 | Sakai | 358/213.19 |
| 4,763,204 | 8/1988 | Kinoshita et al. | 358/909 |
| 4,816,929 | 3/1989 | Bradley et al. | 360/85.1 |
| 4,849,819 | 7/1989 | Ishiguro et al. | 358/213.13 |
| 4,918,533 | 4/1990 | Date et al. | 358/213.13 |

FOREIGN PATENT DOCUMENTS

| | | | |
|---|---|---|---|
| 58-116882 | 7/1983 | Japan | 358/909 |
| 58-171175 | 10/1983 | Japan | 358/213.19 |
| 60-210076 | 10/1985 | Japan | 358/228 |

Primary Examiner—Aristotelis Psitos
Assistant Examiner—Varsha V. Sheladir
Attorney, Agent, or Firm—Sughrue, Mion, Zinn Macpeak & Seas

[57] ABSTRACT

An electronic still camera which photographs an object by image pickup means such as a solid image pickup element or the like and records the video signal of the object into a rotary recording medium such as a magnetic disc or the like. The electronic still camera includes a mechanical shutter and an electronic shutter function to control electrically the accumulation time of the image pickup means and it is adapted such that, when the shutter speed is slower than a predetermined value, it controls a time for exposure to the image pickup means by the mechanical shutter and, when the shutter speed is higher than the predetermined value, it controls the exposure time to the image pickup means by means of the electronic shutter function and also controls the mechanical shutter to remain open at least for the exposure time.

2 Claims, 7 Drawing Sheets

ELECTRONIC STILL CAMERA

This is a continuation of application Ser. No. 07/474,621 filed Jan. 16, 1990, which is a continuation of application Ser. No. 07/134,120 filed Dec. 17, 1987, and both abandoned.

BACKGROUND OF THE INVENTION

1. Field of the Invention

The present invention relates to an electronic still camera in which an object is photographed by image pickup means such as a solid image pickup element and the video signal of the object is recorded into a rotary recording medium such as a magnetic disc or the like, and, in particular, to the control of exposure of such electronic still camera.

2. Description of the Related Art

Recently, there has been developed an electronic still camera system in which an image pickup device such as a solid image pickup element, an image pickup tube or the like is combined with a recording device employing as a recording medium thereof an inexpensive magnetic disc having a relatively larger storage capacity such that an object can be still photographed electronically and recorded into a rotating magnetic disc and the reproduction of the recorded image can be performed by means of a television system, a printer or the like which is provided separately from the electronic still camera system.

In the electronic still camera of the above-mentioned type, as in a so called conventional silver salt still camera (which uses a silver salt film), a single lens reflex camera open photometric system is used because it provides easy framing, easy measurements of distances and so on. In the silver salt still camera, a spring adapted to energize and rotate a clip washer for moving aperture blades is previously charged and engaged; the engagement of the spring is removed according to a release operation so as to stop down the diaphragm momentarily; and, after exposure, when a film is wound up, the spring is charged again.

In such electronic still camera, as described before, there is employed as image pickup means a solid image pickup element such as a charge coupled device (CCD) or the like. For this reason, if the electronics still camera is provided with a function to accumulate electric charges, for example, on the image pickup surface of CCD according to the brightness of an image of an object in photographing, transfer the accumulated electric charges in recording, and discharge remaining electric charges in preparation for the next photographing, then basically there is eliminated the need of a mechanical shutter that is used in the ordinary silver salts still camera.

As the conventional examples of the electronic still camera that is equipped with the above-mentioned electronic shutter function, Japanese Patent laid open No. 62-38675, 62-48182 and 62-172488 can be cited. In Japanese Patent laid open No. 62-38675, there is disclosed an electronic still camera which is provided with a basic electronic shutter function to discharge the remaining electric charges of a solid image pickup element, then pick up an image, and further read out accumulated electric charges.

Also, in Japanese Patent laid open No. 62-48182, there is disclosed an electronic still camera equipped with an electronic shutter function which coincides the time of termination of accumulation of signal charges (which agrees with a read-out time) in a solid image pickup element with the output timing of a vertical synchronization signal.

Further, in Japanese Patent laid open No. 61-172488, there is disclosed a solid image pickup device comprising a light receiving section and an accumulation section, in which electric charges accumulated for a long period of time (about 33 m sec) in the accumulated section is transferred at a high speed of a short time ($\Delta t$) and only the electric charges accumulated in this short time are taken out as video signals, so that the shutter effect of the exposure time $\Delta t$ can be obtained.

As conventionally, if an electronic still camera is structured such that its photographing operation is performed only by means of the above-mentioned electric processings (that is, the accumulation, transfer and discharge of the electric charges in the solid image pickup element) while the image pickup surface of the solid image pickup element such as CCD or the like being exposed, all of unnecessary electric charges cannot be discharged out after photographing, which results in the lowering of the quality of a recorded image (a reproduced image) is similarly lowered in quality.

Also, in the electronic still camera that is provided with only the above-mentioned electronic shutter function as the shutter function thereof, there arises a problem of so called "smearing", that is, while signal charges accumulated in the solid image pickup element are being read out, charges due to the light continuously falling on the light receiving surface of the solid image pickup element are applied to the signal charges being transferred, so that false signals are detected, resulting in the lowering of quality of images.

In order to minimize the influences of the smearing that is produced when an object is photographed by the electronic still camera provided with only the electronic shutter function, the signal charges accumulated in the solid image pickup element must be transferred to a transfer section at a high speed, that is, the signal charges must be read out at a high speed.

However, if the signal charges are transferred at a high speed, there arises an antinomic problem, that is, the transfer efficiency of the signal charges in the solid image pickup element is lowered and, as a result of this, the quality of the image is also lowered.

SUMMARY OF THE INVENTION

The present invention aims at eliminating the drawbacks found in the prior art electronic still camera.

Accordingly, it is an object of the invention to provide an electronic still camera which is capable of recording images of high quality from the low shutter speed region to the high shutter speed region by preventing the lowering of the image quality and the production of the smearing both due to remaining charges in a solid image pickup element as well as by improving the transfer efficiency of the image pickup element.

In the electronic still camera according to the present invention, basically, a mechanical shutter is used jointly with an electronic shutter which is adapted to electronically control the timings of accumulation, transfer and discharge of signal charges in a solid image pickup element so as to provide a shutter effect.

In order to achieve the above object, according to the invention, there is provided an electronic still camera comprising a photographing optical system including a diaphragm mechanism, image pickup means for converting an image of an object focused by the photographing optical system into an electric video signal and for accumulating the electric video signal, recording means for recording the video signal into a rotary recording medium, a mechanical shutter interposed between the photographing optical system and the image pickup means, photograph mode setting means for setting various photograph modes including a sequentially photographing mode, and record control means for controlling the diagram mechanism, mechanical shutter, image pickup means and recording means according to the brightnesses of the object transmitted by means of the photographing optical system and for reading out the video signal obtained by being exposed to the image pickup means in synchronization with the output timing of a reference signal used to determine the control cycles of various controls so as to allow the video signal to be recorded into the rotary recording medium, wherein the record control means is adapted such that, when the shutter speed determined during the exposure control of the image pickup means is lower than a predetermined value, it control the exposure time to the image pickup means to coincide with the time during which the mechanical shutter is open, and, on the other hand, when the determined shutter speed is higher than the predetermined value or in the case of a high-speed sequential photographing, it discharges the remaining electric charges of the image pickup means at a timing earlier by an actual exposure time than the read-out timing of the video signal, and, using as an exposure time a time at least longer than a time obtained by adding the actual exposure time to a time required to open and close the mechanical shutter, it controls the opening or closing of the mechanical shutter, so that the video signals accumulated in the image pickup means from the discharge timing of the remaining electric charges up to the actual exposure time can be read out at a time after the actual exposure time elapses from the discharge time.

In the electronic still camera according to the present invention, as described before, the mechanical shutter and the electronic shutter are jointly used over the whole range of the shutter speed. More specifically, the shutter speed in the neighborhood of the limitation to be able to maintain the control precision of the mechanical shutter is employed as a reference shutter speed. That is, in the shutter speeds lower than the reference shutter speed, the operation of the shutter is switched to a mechanical-shutter-oriented operation mode (which is hereinafter referred to as a mechanical shutter mode (M SHT)) in which the exposure time of the image pickup surface of the image pickup means can be determined simply by the opening/closing control of the mechanical shutter, and, on the other hand, in the higher shutter speeds than the reference shutter speed, the shutter operation is changed over to an electronic-shutter-oriented operation mode (which is hereinafter referred to as an electronic shutter mode (E SHT)) in which the exposure time can be determined by the electronic shutter.

In the mechanical shutter mode, the exposure control is carried out by opening and closing the mechanical shutter such that the exposure time calculated in accordance with the brightness of the object on the image pickup surface of the image pickup means coincides with the time during which the mechanical shutter is open. The electric charges that are accumulated within the above-mentioned exposure time are read out in synchronization with the reference signal for determining the control cycles that is output first after the termination of the exposure time, and are then recorded into the recording medium. After such recording, there remain few electric charges, that is, the electric charges are discharged substantially completely, which allows preparation for next photographing.

Also, in the electronic shutter mode, the remaining electric charges of the image pickup means are discharged at a timing earlier by a time corresponding to the actual exposure time than the read-out time of the video signal and the control of opening or closing of the mechanical shutter is performed, using as an exposure time a time longer than at least a time obtained by adding the above-mentioned actual exposure time and a time required to open or close a shutter curtain. The video signals that are accumulated in the image pickup means within a time corresponding to the above-mentioned actual time of the newly determined exposure time are read out. For this reason, in this case, the damage of a color filter which is combined with the image pickup element is reduced when compared with a conventional electronic still camera in which photographing is performed with the image pickup surface of the image pickup element being exposed all the time.

Further, due to the fact that the mechanical shutter is used in the mechanical shutter mode, the generation of smearing can be prevented. That is, when the accumulated electric charges are transferred (read out) to the image pickup means, there is eliminated the need to transfer the electric charges at a high speed in order to prevent the generation of smearing, with the result that the transfer efficiency of the image pickup means of CCD or the like can be enhanced.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of an electronic still camera according to the present invention with reference to the accompanying drawings.

Figure 1:
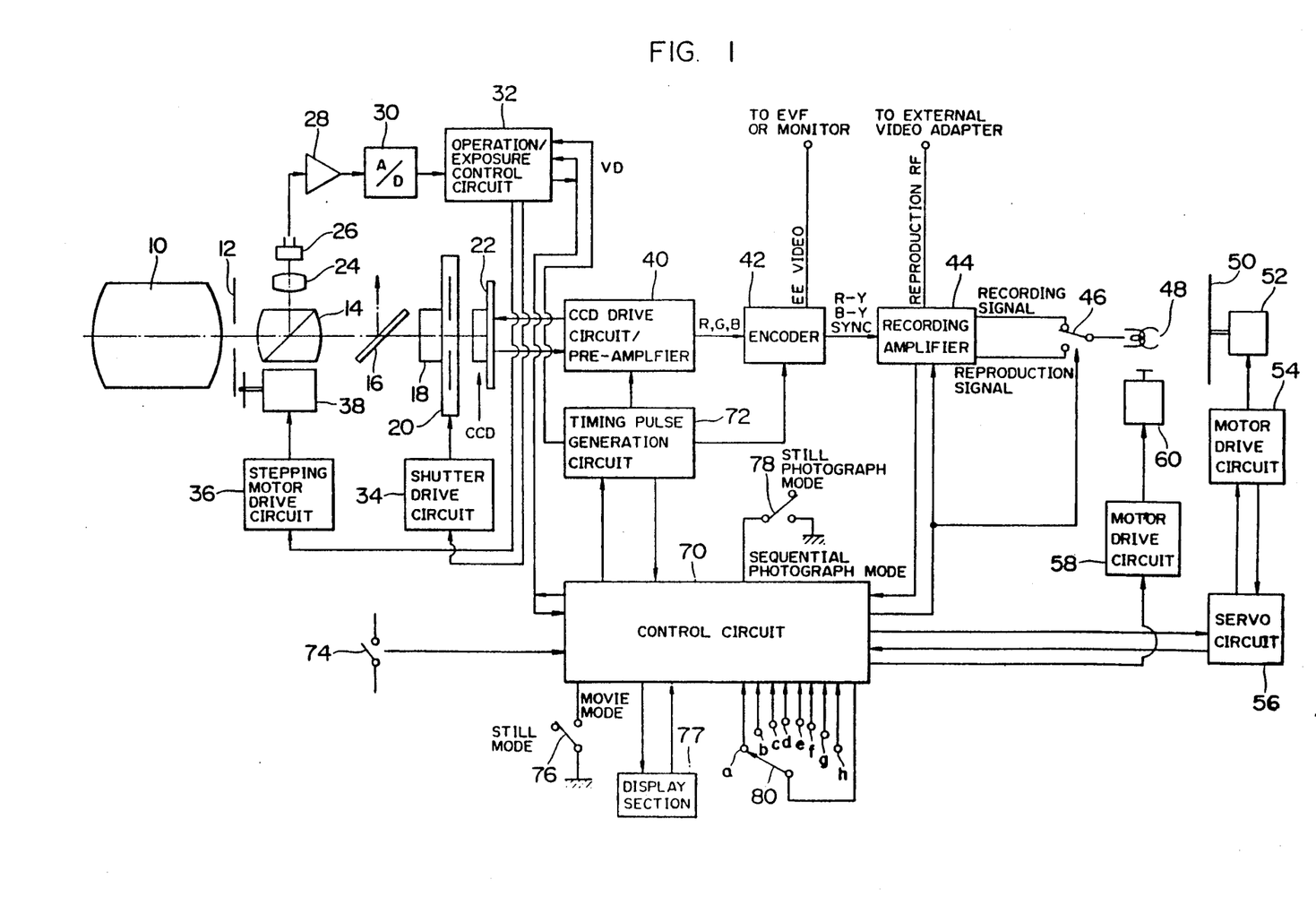
FIG. 1 is a block diagram to show the general structure of an embodiment of an electronic still camera according to the invention.

Referring first to FIG. 1, there is shown the general structure of an embodiment of an electronic still camera according to the present invention. In this figure, a photographing optical system comprises a front group lens system such as a zoom lens system, a diaphragm 12 and the like, and a master lens system. The master lens system 14 serves also as a beam splitter to light reading optical system 24. Reference numeral 16 designates a mirror to a finder optical system and the mirror 16 can be jumped up in photographing. Reference numeral 18 designates an optical filter and 20 stands for a shutter (mechanical shutter). In a still mode that is an operation mode to perform still image photographing, the shutter 20 is made open for predetermined seconds after the above mentioned mirror is jumped up and the diaphragm is stopped down. On the other hand, in a movie mode in which a video adapter is connected to an electronic still camera so that the electronic still camera can serve as a movie camera, the shutter 20 remains open. Numeral 22 designates a CCD of an image pickup element.

Part of the light of an object transmitted into the above-mentioned photometric optical system 24 is received by a light reading sensor 26, amplified by a light reading amplifier 28, and input through an A/D converter 30 into an operation/exposure control circuit 32. In accordance with information such as the brightness of the object light transmitted therein, the operation/exposure control circuit 32 controls the above-mentioned shutter and diaphragm by means of a shutter drive circuit 34 and a diaphragm drive mechanism to obtain a proper exposure.

According to the illustrated embodiment of the invention, in the diaphragm mechanism, there are employed a stepping motor 38 and a stepping motor drive circuit 36, whereby a function to limit the number of pulses for driving the stepping motor is provided in the above-mentioned operation/exposure control circuit.

Reference numeral 40 designates a CCD drive circuit/pre-amplifier which drives the image pickup element (CCD) 22 and reads out and amplifies the electric charges of the image pickup element 22, 42 and encoder which converts the output signals of the CCD drive circuit/pre-amplifier into video signals, and 44 a recording amplifier to amplify the video signals. From the encoder 42 there is provided an output to an electronic view finder (EVF) or to a monitor, and from the recording amplifier 44 there is provided an output to an external video adapter. The recording amplifier 44 is also connected via a recording/reproducing change-over switch 46 to a recording head 48. Numeral 50 designates a magnetic disc which records the video signals, 52 a disc motor, 54 a motor drive circuit, 56 a servo circuit used to rotate the disc 50 at a constant speed, and 58 a drive circuit which drives a motor 60 for feeding the above-mentioned recording head 48.

Reference numeral 70 designates a control circuit which receives signals from respective circuits to control the operations of the whole system; 72 a timing pulse generation circuit which generates timing pulses under its control to output them to CCD 22, OPERATION/CONTROL CIRCUIT 32, CCD DRIVE CIRCUIT 40, ENCODER 42 and the like; 74 a release button; 76 a still/movie mode switching means which switches the still mode and the movie mode into each other; and, 77 a display section which displays the operation state of the camera or the like.

Also, numeral 78 designates a photograph mode change-over switch. In the still mode, if the photograph mode change-over switch 78 is turned off, then a single photograph mode is set in which a single frame of still image is photographed: on the other hand, if the change-over switch 78 is turned on, then sequential photograph mode is set in which a plurality of frames of still images are photographed according to the set sequential photograph speed. The photograph mode change-over switch 78 is normally set in the "on" state.

Numeral 80 designates a sequential photograph speed setting switch. The sequential photograph speed setting switch 80 is equipped with 8 contacts (that is, contacts a, b, c, d, e, f, g, h) which can be selected manually, so that the number of frames to be photographed a predetermined time can be determined according to the selection of the contacts. In the illustrated embodiment, for example, if the contact a is selected, then a 15 frames/sec. photograph is executed. Similarly, according to the selection of the following contacts b–h, a 10 frames/sec. photograph (contact b), a 5 frames/sec. photograph (contact c), a 2 frames/sec. photograph (contact d), a 1 frame/sec. photograph (contact e), a 1 frame/2 seconds photograph (contact f), a 1 frame/5 seconds photograph (contact g), and a 1 frame/10 seconds (contact h) are carried out respectively.

Also, in the illustrated embodiment, when the sequential photograph speed is set to the 15 frames/sec. by the sequential photograph speed setting switch 80 and the sequential photograph mode is set by the photograph mode change-over switch 78, then a high speed sequential photograph mode is selected.

Figure 2:
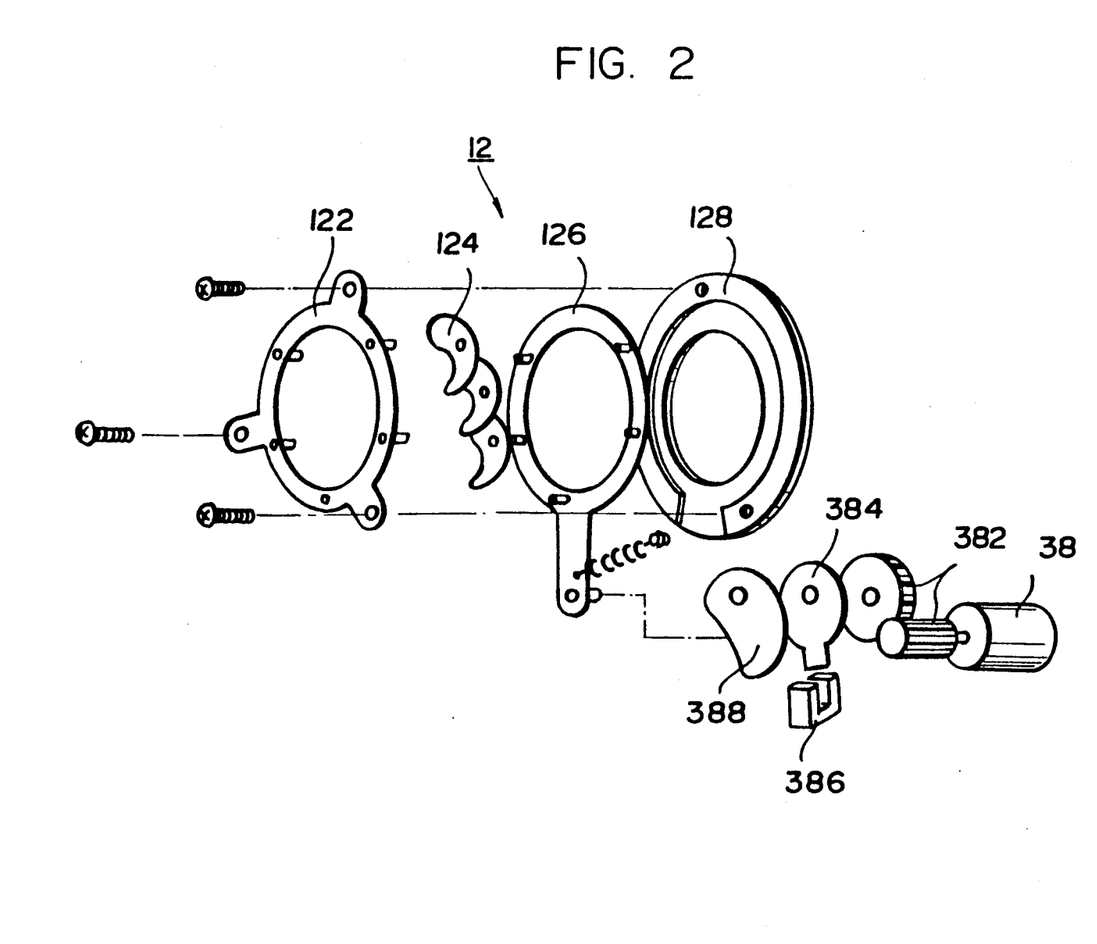
FIG. 2 is a perspective view to show the mechanical structure of a diaphragm and a stepping motor.

Referring now to FIG. 2, there is shown a perspective view to illustrate the mechanical structure of the diaphragm 12 and the stepping motor 38. The diaphragm 12 includes a perforated member 122, aperture blades 124, a clip washer 126 and a receiver member 128. On the other hand, on the side of the stepping motor, there are provided gears 382, an encoder 384, a photo interrupter 386 and a cam 388. The above-mentioned chrysanthemum-shaped metal fixture 126 has a cam follower and the metal fixture 126 is energized by a spring such that it is in contact with the cam surface of the cam 388. Also, the encoder 384 and the photo interrupter 386 are used to detect the open photometic position (or, home position). That is, in the still mode photograph, the light reading is always carried out at the home position (or, open photometry) and, according to the resultant light reading data, a pulse is given to the stepping motor to stop down the diaphragm. On the other hand, in the movie mode, after the diaphragm 12 is fed according to a given step from the home position, a correction corresponding to the variation in the quantity of light is made by the diaphragm.

Next, description will be given below of the operations of the above-mentioned electronic still camera constructed in accordance with the present invention, in the still mode and movie mode, with reference to FIGS. 3 and 4.

Figure 3:
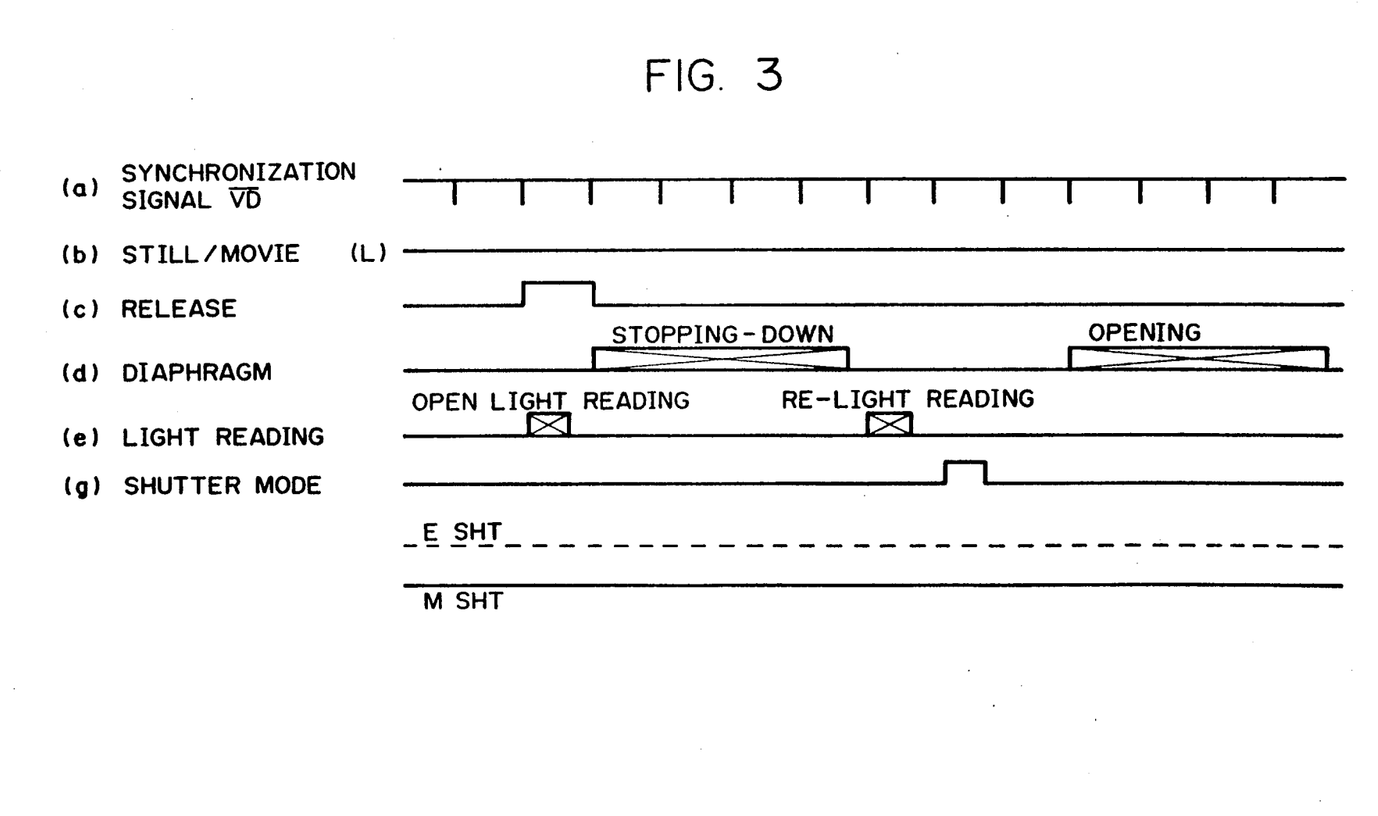
FIG. 3 is a timing chart to show the operation states is a still mode photographing.

Now, FIG. 3 is a timing chart to show the timings that occur in the still mode photographing. In this figure, $\overline{VD}$ designates a synchronization signal obtained by inverting a vertical synchronization signal and it serves as a reference signal to determine the control cycles of various controls on photographing. For this reason, in the case of the NTSC system, the pulse rate is about 60 pps. In this case, since the electronics still camera is set in the still mode, a signal from the still/movie switching means 76 remains in the low level and the shutter mode, in this case, is set in the mechanical shutter mode (M SHT). If an operator waits for a shutter chance and presses down the release button (switch) 74, then, in accordance with instructions from the control circuit 70 and the operation/exposure control circuit 32, the A/D converter 30 transmits photo metric data to the operation/exposure control circuit 32, with the diaphragm 12 being open. In accordance with the photometric data, the operation/exposure control circuit 32 operates the combination of a proper shutter speed with a proper diaphragm value and sends out a pulse to the stepping motor drive circuit 36. The stepping motor drive circuit 36 operates the stepping motor, for example, by means of a two-phase excitation system, causing the diaphragm 12 to be stopped down to the value that is obtained by the above-mentioned operation. Then, the light reading operation system measures again the quantity of light by means of a stopped-down-aperture metering system. The reason why the quantity of light is measured again is that, when compared with a silver salt still camera, the image pickup element of the electronic still camera is narrower in latitude, which requires a more accurate exposure control. In accordance with the re-measured light value, the light reading operation system determines the shutter speed finally and outputs to the shutter drive circuit 34 a pulse corresponding to an exposure time for exposure.

In FIG. 3, a blank existing from the exposure to the opening of the diaphragm is a time required to return the mirror 16 of the finder optical system to its normal position and to open the diaphragm and thus the time corresponds to a time required to advance a film in the silver salt still camera. Although the mirror 16 is jumped up according to the depression of the release button 74, in the case of the illustrated embodiment, due to the fact that the light for light measuring the quantity of light is taken in prior to the mirror 16, the light quantity re-measurement will never be influenced by the jumping of the mirror 16.

In the foregoing description, there has been discussed a system in which the errors in the diaphragm value with respect to a program operation are absorbed by the shutter speed using the exposure control in a program exposure system. However, it is clear that the present application can also apply to an aperture-priority system in which the diaphragm value is previously decided and the shutter speed is made variable, or to a shutter-speed-priority system in which the shutter speed is set to a desired value and the diaphragm value is made variable.

Figure 4:
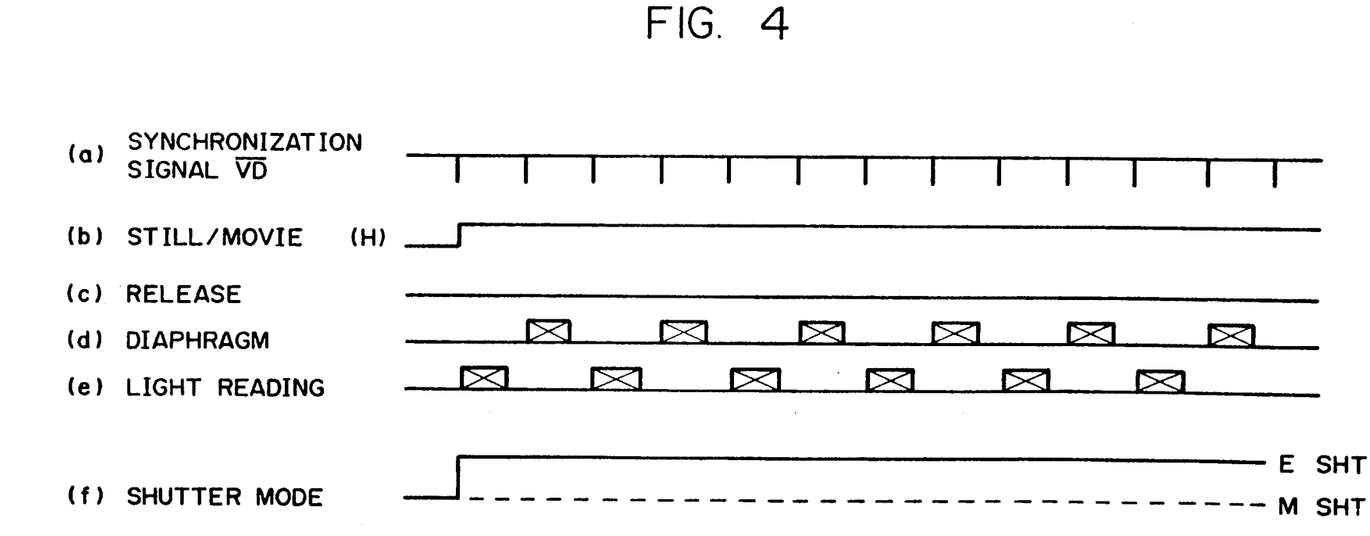
FIG. 4 is a timing chart to show the operation states in a movie mode photographing.

Now, FIG. 4 is a timing chart to show the timings that occur in the movie mode photographing. In this instance, due to the fact that an electronic view finder or a video adapter is mounted to a multi-connector which is used to mount accessories, the still/movie switching signal becomes high in level, with the result that the movie mode is set and the shutter mode is set into the electronic shutter mode. Therefore, the release signal is ignored and the light reading is initiated. The mirror 16 to an optical finder remains sprung up. Although the stepping motor is driven based on the photometic results, the light reading and the diaphragm value are controlled with the diaphragm being stopped down. As a result of this, the stepping motor 36 has only to make up for the variation in the brightness and generally the working amounts of the stepping motor 36 can be reduced when compared with the still mode. On completion of the diaphragm correction, the exposure is carried out.

In the movie mode, the stepping motor may be driven at the same pulse rate as in the still mode. However, in the movie mode, due to the small diaphragm correction quantities in the respective corrections, the pulse rate of the stepping motor may also be lower than one in the still mode to be able to reduce the possibility of generation of over-shooting and linking, thereby resulting in a smooth control.

Figure 5:
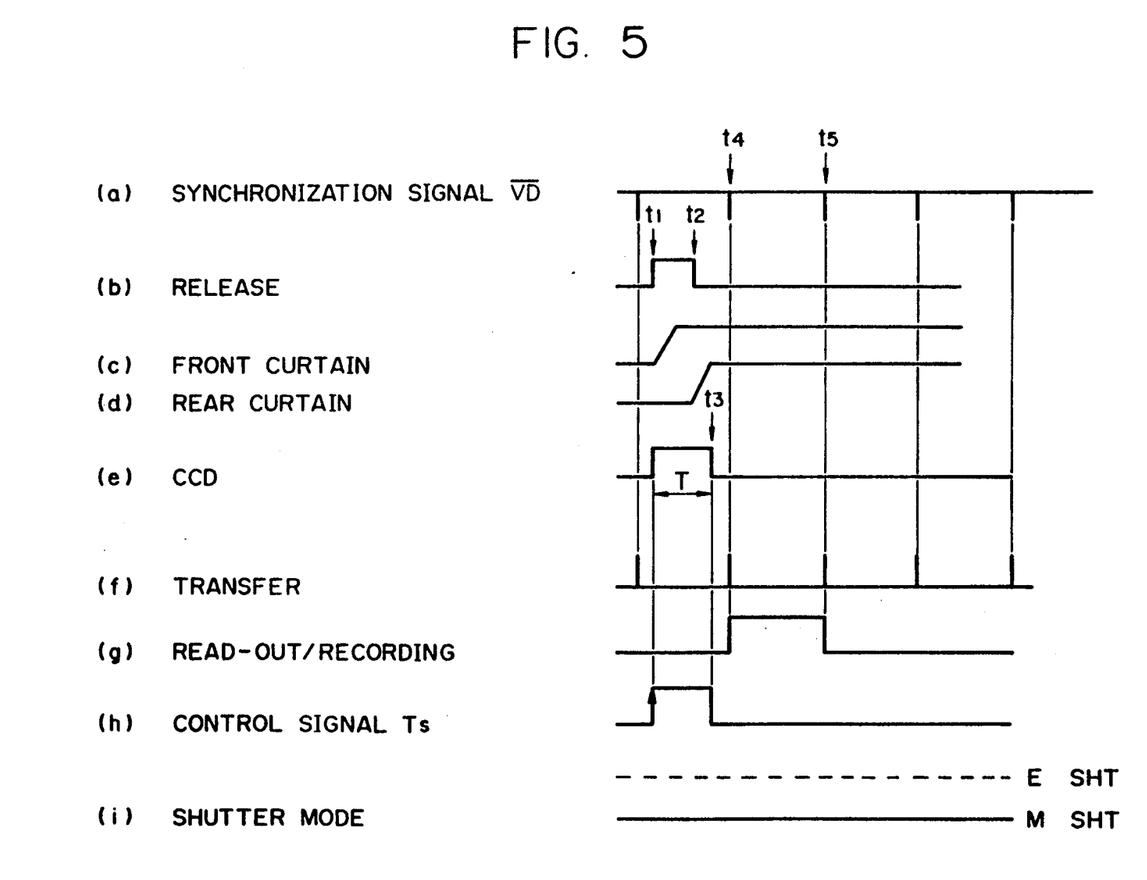
FIG. 5 is a timing chart to show the operation states of an exposure control in the case of the shutter speed less than 1/1000 sec. in the still mode photographing.
Figure 6:
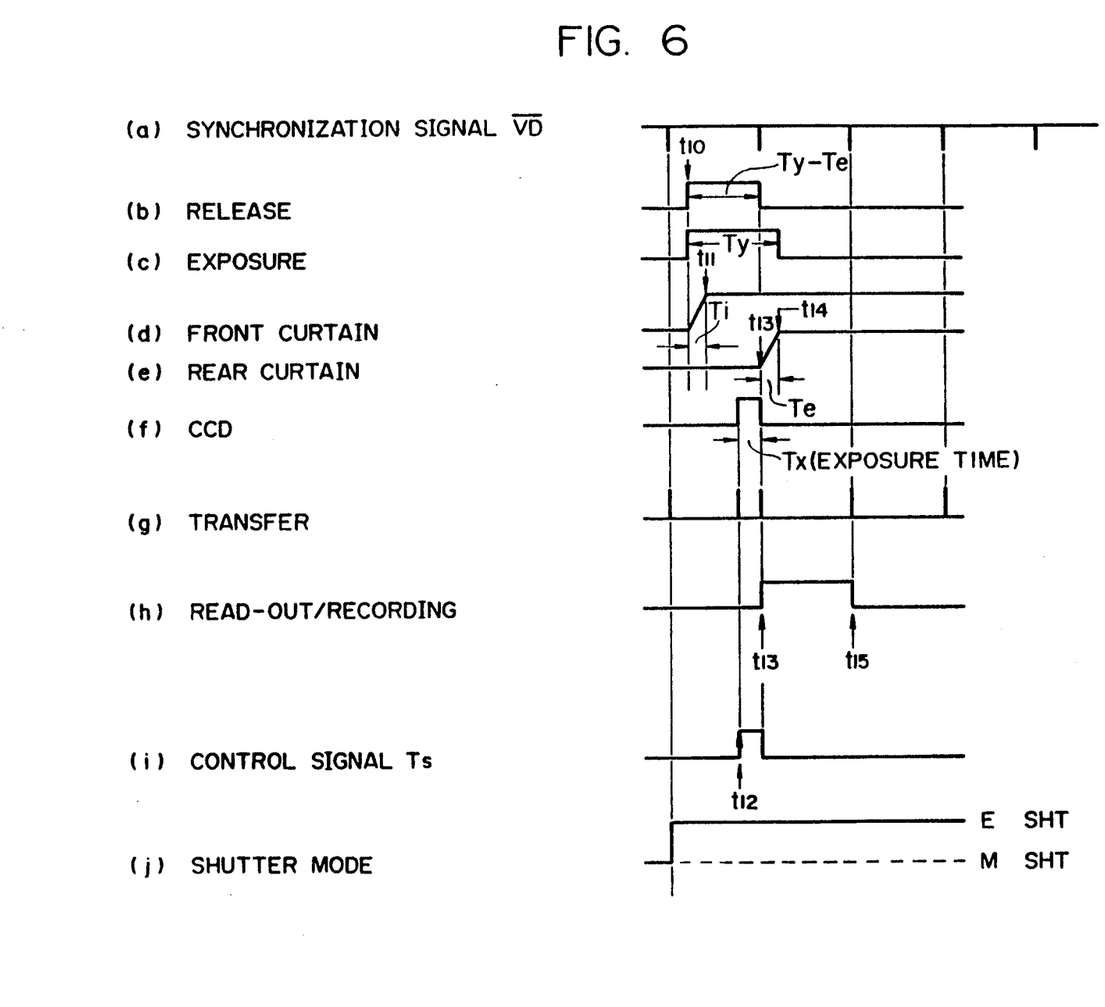
FIG. 6 is a timing chart to show the operation contents of the exposure control in the case of the shutter speed more than 1/1000 sec. in the still mode photographing; and, FIG. 7 is a timing chart to show the operation contents of the exposure control in a high-speed sequential photographing mode.
Figure 7:
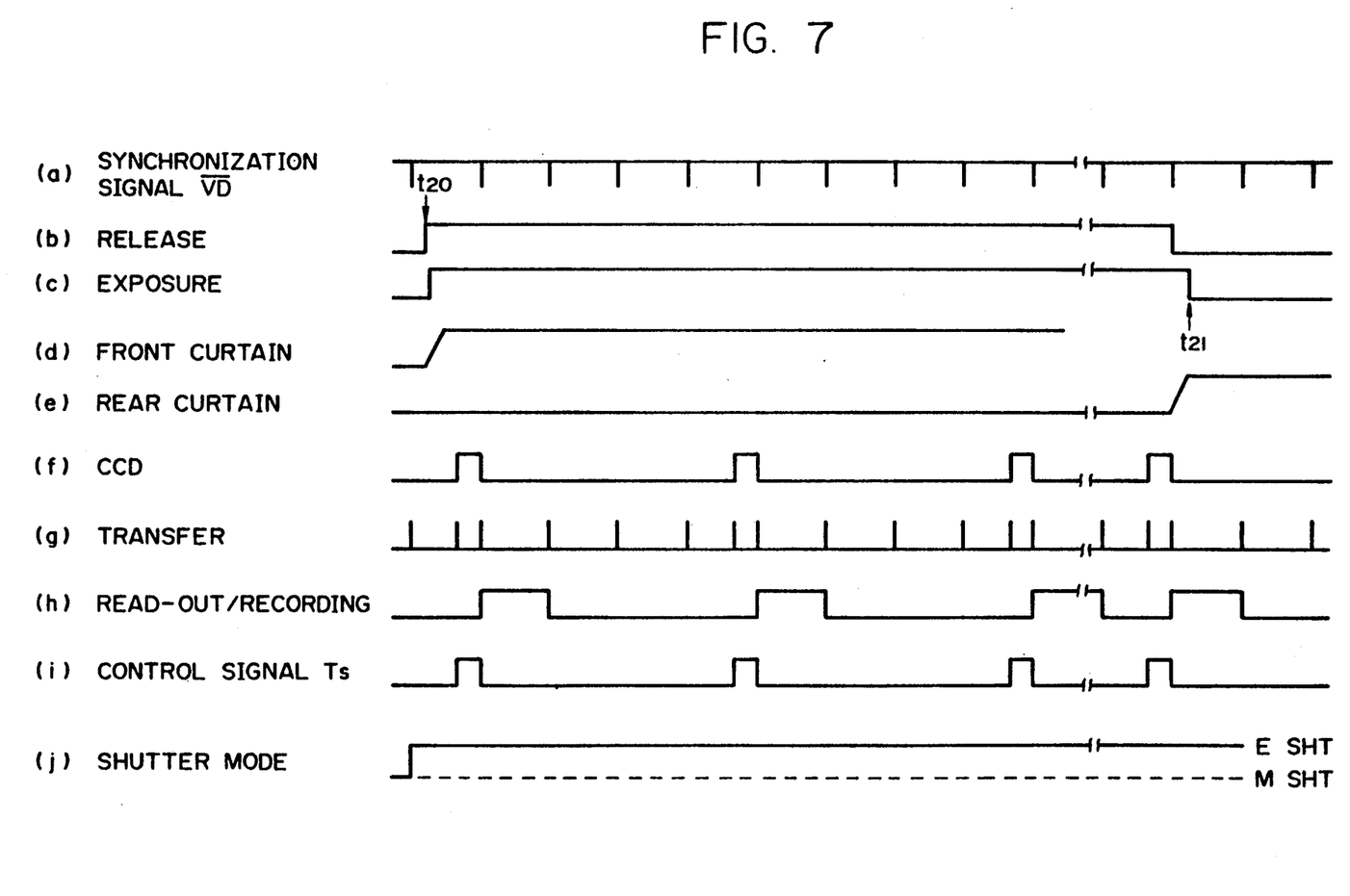

Next, in FIGS. 5 to 7, there are shown the operations of the exposure controls in the still mode photographing. Referring first to FIG. 5, there are illustrated the contents of the operations of an exposure control to be performed in the case when the shutter speed is equal to or slower than 1/1000 sec. which is a value in the neighborhood of the limit value of the shutter speed that can maintain the control precision of the mechanical shutter. In this case, the shutter mode is set into the mechanical shutter mode. In FIG. 5, an exposure time is calculated by the operation/exposure control circuit 32 in accordance with the photometic results and a pulse corresponding to the thus calculated exposure time is output via the shutter drive circuit 34. As a result of this, at a time t1 a front curtain begins to run and then, after a rear curtain begins to run at a time t2, the rear curtain ends its running, when the shutter becomes closed (FIG. 5, (b), (c), (d)). Consequently, during a time T extending from the time t1 to the time t3, the image pickup surface of the image pickup element 22 is exposed to light (FIG. 5 (e)).

On the other hand, the CCD drive circuit 40 outputs a transfer pulse to the image pickup element 22 in synchronization with a synchronization pulse $\overline{VD}$ that is output from the timing pulse generation circuit 72 (FIG. 5 (f)). For this reason, normally, the accumulated electric charges are transferred at the output timings of the synchronization signals $\overline{VD}$ from the image pickup element 22. However, in the mechanical shutter mode, a control signal Ts to discharge the electric charges accumulated so far is output from the timing pulse generation circuit 72 to the CCD drive circuit 40 in synchronization with the shutter release (FIG. 5 (h)).

The control signal Ts is a signal to determine a timing at which the remaining electric charges of the image pickup element 22 are discharged according to the shutter speed (in fact, the control signal is output from the control circuit 70 via the timing pulse generation circuit 72 to the CCD drive circuit 40), and the transfer pulse is output at the rising of the control signal Ts, whereby in the mechanical shutter mode if the control signal Ts is high, the transfer of the accumulated electric charges of the image pickup element 22 is prohibited. Therefore, in synchronization with the rising of the control signal Ts, the transfer pulse is output at the timing t1, and, in the image pickup element 22, the accumulated electric charges are discharged and at the same time the exposure is initiated. After completion of the exposure, during 1V (a vertical scan time) extending from a time t4 at which the synchronization signal $\overline{VD}$ is output from the timing pulse generation circuit 72 to a time t5, the signal electric charges accumulated in the image pickup element 22 are transferred so that the video signals are recorded into a predetermined track of the magnetic disc 50 (FIG. 5(g)).

As mentioned above, in the shutter speed range of 1/1000 sec. or slower, since the time during which the shutter is open is equal to the actual exposure time, the electric charges remaining in the image pickup element 22 after the photographing is completed can be discharged almost completely.

Referring next to FIG. 6, there are shown the contents of the operations of the exposure controls in the case of the shutter speed of 1/1000 sec. or higher. In this case, the shutter mode is set into the electronic shutter mode (FIG. 6(j)). In FIG. 6, assuming that an actual exposure time calculated by the operation/exposure control circuit 32 in accordance with the photometric results is Tx, that a time required to open and close the shutter curtain, namely, in the illustrated embodiment a time required from the initiation of running of the front curtain to the complete opening of the shutter is Ti, and that a time required from the initiation of running of the rear curtain to the termination of running of the rear curtain is Te, then a time Ty longer than a value obtained by adding the above-mentioned three times, that is, Tx+Ti+Te, is newly determined as an exposure time.

Also, a pulse corresponding to a time Ty−Te is output by the operation/exposure control circuit 32 via the shutter drive circuit 34 to the shutter 20 at a time t10 (FIG. 6(b)). As a result of this, the front curtain begins to run at the time t10 and the shutter curtain becomes completely open at a time 11 (FIG. 6 (d)). Further, at a time t13 when a time=Ty−Te−Ti has elapsed from the time t11, the rear curtain begins to run, and, at a time t14 when the time Te has elapsed from the time t13, the rear curtain ends in running, so that the shutter 20 becomes completely closed (FIG. 6(e)). During the above-mentioned new exposure time Ty required for opening and closing of the shutter, the exposure of the image pickup element 22 is carried out (FIG. 6 (c)). In other words, the signal electric charges accumulated in the image pickup element 22 are read out in synchronization with the synchronization signal $\overline{VD}$ that is output from the timing pulse generation circuit 72 after the shutter release is initiated. In this case, at a time t12 which is prior to a time for such readout by the actual exposure time Tx, a control signal Ts is output from the timing pulse generation circuit 72 to the CCD drive circuit 49. As a result of this, a transfer pulse is output at the time t12, the remaining electric charges of the previously accumulated electric charges in the image pickup element 22 are discharged between the time t10 and the time t12, and at the same time the exposure is carried out again on the image pickup surface of the image pickup element 22 for the time Tx extending from the time t12 to the time t13 (FIG. 6 (f), (g)). And this time Tx becomes an actual exposure time required to obtain the video signals and also the time Tx is set electrically, with the result that the shutter speed can be increased substantially.

Then, during a period extending from the time t13 at which the exposure causing the synchronization signal $\overline{VD}$ to be output to a time t15 at which the next synchronization signal $\overline{VD}$ is output, the signal electric charges that are accumulated in the image pickup element 22 during the exposure time are read out and recorded into a predetermined track on the magnetic disc 50.

Next, in FIG. 7, there are shown the contents of the operations of the exposure controls when in the still mode the photographing mode is set into the high speed sequential photograph mode. In FIG. 7, if the photograph mode change-over switch 78 is turned on, the sequential photograph speed setting switch 80 is set to the contact a, and the release button 74 is then pressed down, then a high speed sequential photograph of 15 frames/sec. can be performed. Although except for the operation of the shutter 20 the operation to photograph 1 frame in this high speed sequential photograph mode is similar as in the single photograph mode shown in FIG. 6 in which the shutter speed is a high speed, the high speed sequential photograph mode is different from the single photograph mode in that the shutter 20 remains open during a period extending from a time 20 at which the shutter release is performed to a time t21 at which the number of frames to be sequentially photographed has been photographed completely.

As has been described hereinbefore, according to the present invention, an electronic still camera is structured such that a mechanical shutter and an electronic shutter are used jointly over the whole range of the shutter speeds, there is employed as a reference speed a shutter speed in the neighborhood of the limit that can maintain the control precision of the mechanical shutter, the shutter mode of the present camera can be switched into a mechanical shutter-oriented mechanical shutter mode when the shutter speeds are slower than the reference speed, and the shutter mode can be switched to an electronic shutter-oriented electronic shutter mode when the shutter speeds are higher than the reference speed or in the case of a high speed sequential photographing. Therefore, according to the invention, it is possible to prevent the generation of smearings as well as to improve the transfer efficiency of an image pickup element, so that higher quality images can be recorded over the whole shutter speeds range.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic still camera comprising:
   a photographing optical system including a diaphragm mechanism;
   image pickup means having a plurality of photo-electric conversion element for accumulating in said photo-electric conversion elements the electric charges that correspond to the amounts of the incident light of an image of an object formed by said photographing optical system and also for reading out said electric charges as video signal in accordance with a readout signal;
   recording means for recording said video signal into a rotary magnetic recording medium;
   a mechanical shutter interposed between said photographing optical system and said image pickup means for controlling the time of exposure for said image pickup means by controlling the opening and closing of a shutter screen thereof;
   an electronic shutter for controlling the time of accumulation of said electric charges extending from when said electric charges are discharged in accordance with a sweep signal to when said electric charges are read out in accordance with said readout signal;
   setting means for setting a predetermined value representing the shutter speed limit value that can maintain the control accuracy of said mechanical shutter;

light measuring means for detecting the brightness of said object;

determining means for determining a shutter speed in accordance with the detected outputs of said light measuring means;

comparison means for comparing said shutter speed determined by said determining means with said predetermined value set by said setting means; and, shutter control means operable, if said determined shutter speed is slower than said predetermined value, for controlling said mechanical shutter so that the exposure time thereof is made to correspond to said determined shutter speed and being operable, if said shutter speed is faster than said predetermined value, for controlling said mechanical shutter so that said shutter screen of said mechanical shutter remains open, said shutter control means controlling, when said shutter screen of said mechanical shutter is controlled to remain open, said electronic shutter so that said time of accumulation of said electric charges thereof is made to correspond to said shutter speed, and said shutter control means controlling said mechanical shutter to close the shutter screen thereof in synchronization with said readout signal so as to prevent generation of smearing.

2. An electronic still camera comprising:

a shutter release button;

setting means for setting a sequential photographing speed;

a photographing optical system including a diaphragm mechanism;

image pickup means having a plurality of photo-electric conversion element for accumulating in said photo-electric conversion elements the electric charges that correspond to the amounts of the incident light of an image of an object formed by said photographing optical system and also for reading out said electric charges as video signal in accordance with a readout signal;

recording means for recording said electric video signals into a rotary magnetic recording medium;

a mechanical shutter interposed between said photographing optical system and said image pickup means for controlling the time of exposure for said image pickup means by controlling the opening and closing of a shutter screen thereof;

an electronic shutter for controlling the time of accumulation of said electric charges extending from when said electric charges are discharged in accordance with a sweep signal to when said electric charges are read out in accordance with said readout signal;

light measuring means for determining the brightness of said object;

determining means for determining a shutter speed in accordance with the detected outputs of said light measuring means;

means for discriminating between a low speed sequential photographing mode and a high speed sequential photographing mode based on whether said mechanical shutter can respond to said sequential photographing speed set by said setting means; and shutter control means operable, if said shutter release button is turned on during said low speed sequential photographing mode, for controlling said mechanical shutter so that the exposure time thereof is made to correspond to said determined shutter speed and also that the sequential photographing speed set by said setting means remains until said shutter button is turned off, said shutter control means operable, if said shutter release button is turned on during said high speed sequential photographing mode, for controlling said mechanical shutter so that said shutter screen of said mechanical shutter remains open, and during a time said shutter screen of said mechanical shutter is controlled to remain open, for controlling said electronic shutter so that said time of accumulation of said electric charges is made to correspond to said shutter speed and also that the sequential photographing speed set by said setting means remains until said shutter release button is turned off, and said shutter control means controlling said mechanical shutter to close said shutter screen in synchronization with the turning-off of said release button so as to prevent generation of smearing.

* * * * *